(12) United States Patent
Christner et al.

(10) Patent No.: US 12,117,966 B2
(45) Date of Patent: Oct. 15, 2024

(54) SYSTEM AND METHOD FOR PROXYING IO SESSIONS TO INJECT EXTERNAL PROCESSING

(71) Applicant: EMC IP Holding Company LLC, Hopkinton, MA (US)

(72) Inventors: Joel Christner, El Dorado Hills, CA (US); Amy N. Seibel, Newton, MA (US); Nicole Reineke, Northborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 8 days.

(21) Appl. No.: 17/446,539

(22) Filed: Aug. 31, 2021

(65) Prior Publication Data

US 2023/0062436 A1 Mar. 2, 2023

(51) Int. Cl.
| | | |
|---|---|---|
| *G06F 15/16* | (2006.01) | |
| *G06F 9/54* | (2006.01) | |
| *G06F 16/13* | (2019.01) | |
| *G06F 16/17* | (2019.01) | |
| *G06F 16/172* | (2019.01) | |
| *G06F 21/62* | (2013.01) | |

(52) U.S. Cl.
CPC .......... *G06F 16/1734* (2019.01); *G06F 9/545* (2013.01); *G06F 16/13* (2019.01); *G06F 16/172* (2019.01); *G06F 21/6218* (2013.01)

(58) Field of Classification Search
None
See application file for complete search history.

(56) References Cited

U.S. PATENT DOCUMENTS

| | | | | |
|---|---|---|---|---|
| 2008/0034419 | A1* | 2/2008 | Mullick | H04L 63/0272 726/15 |
| 2008/0127292 | A1* | 5/2008 | Cooper | G06F 21/6281 718/1 |
| 2008/0282337 | A1* | 11/2008 | Crawford | H04L 9/40 726/14 |
| 2010/0024036 | A1* | 1/2010 | Morozov | G06F 21/74 726/26 |
| 2011/0289220 | A1* | 11/2011 | Henson | H04M 3/5116 709/227 |

* cited by examiner

*Primary Examiner* — Alex Gofman
*Assistant Examiner* — Shelly X Qian
(74) *Attorney, Agent, or Firm* — Workman Nydegger

(57) ABSTRACT

One example method includes injecting processing into sessions including IO sessions. Events in a file system are intercepted and processed. During processing, policies may be applied to the events. Some of the policies are triggered such that external actions or processing is applied to the event. Once the actions have been performed, the event may be processed by the file system.

15 Claims, 12 Drawing Sheets

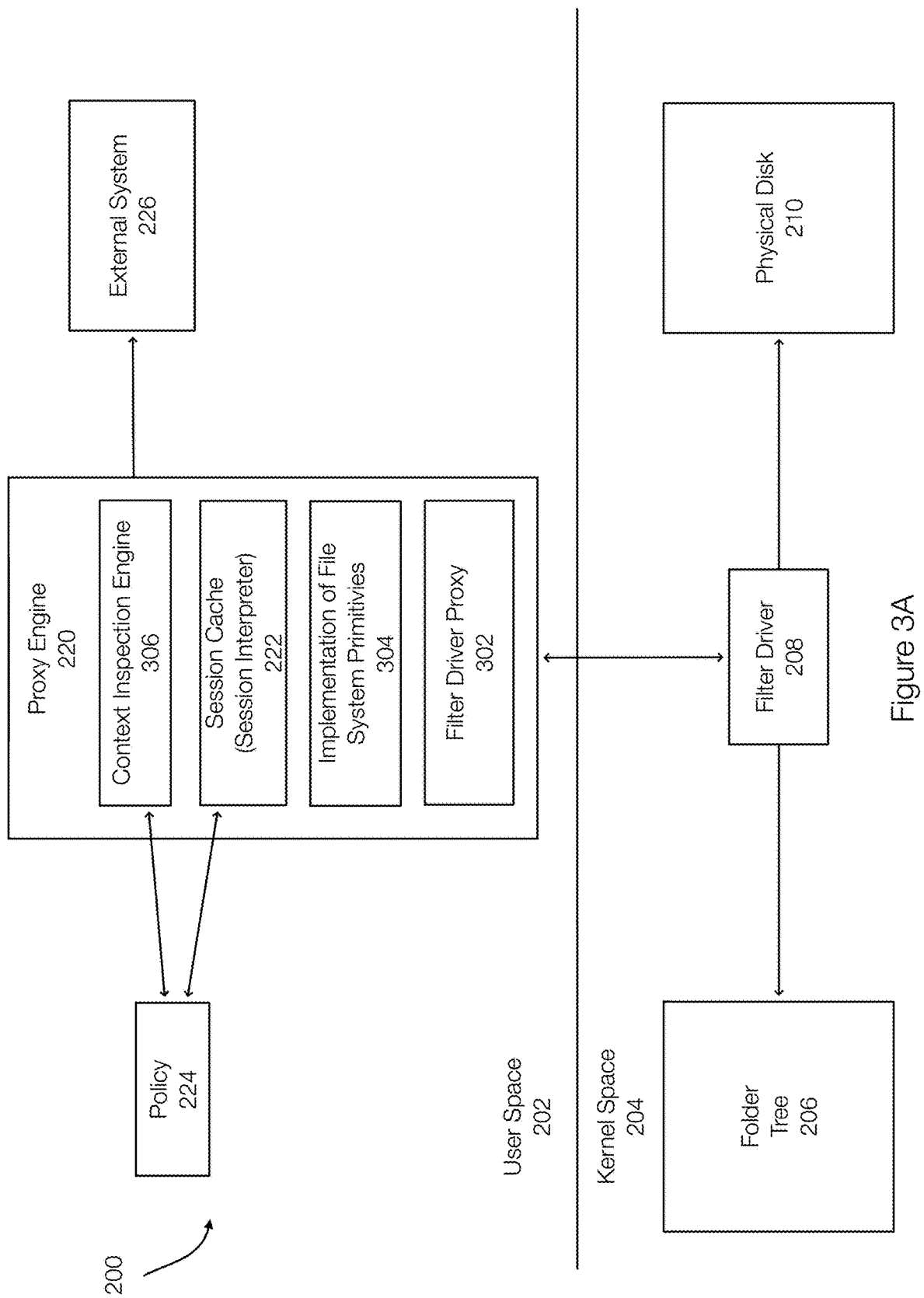

SYSTEM AND METHOD FOR PROXYING IO SESSIONS TO INJECT EXTERNAL PROCESSING

FIELD OF THE INVENTION

Embodiments of the present invention generally relate to proxying sessions in order to inject or perform external processing. More particularly, at least some embodiments of the invention relate to systems, hardware, software, computer-readable media, and methods for performing processing with respect to file system sessions and/or file system events.

BACKGROUND

File system events, such as IO requests to a disk, do not provide any insight or understanding regarding a larger overall action or behavior. For example, a simple request to create a file may result in multiple primitives. The context of file system primitives is not understood from the perspective of a single primitive. Further, the ability to perform processing on a given primitive is difficult because the information available and on which the processing may be based, is limited. Systems and methods are needed to improve the ability to perform processing on file system events.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 3A discloses additional aspects of the proxy engine shown in FIG. 2;

DETAILED DESCRIPTION OF SOME EXAMPLE EMBODIMENTS

Figure 1:
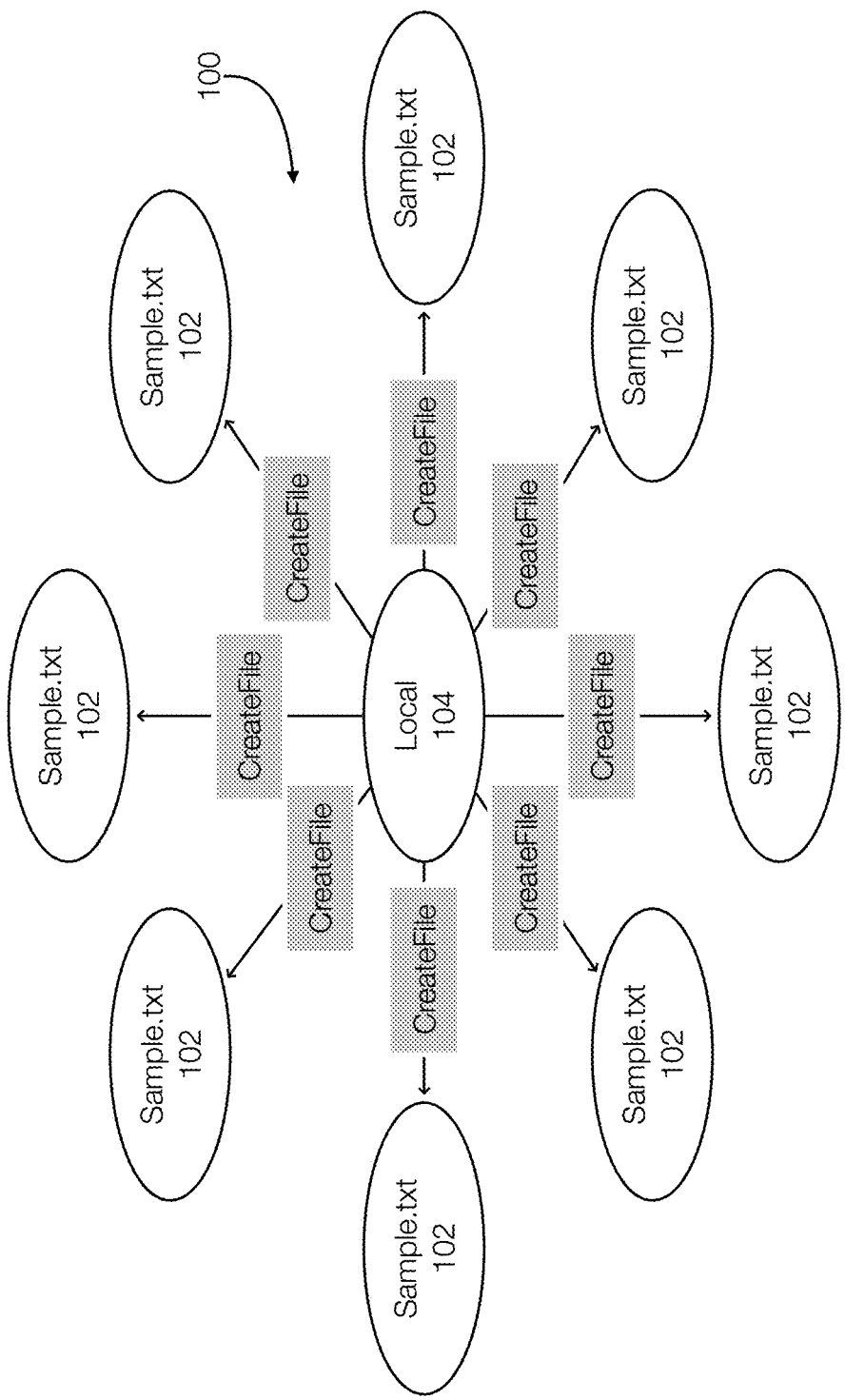
FIG. 1 discloses aspects of file system events in a local file system.

Embodiments of the present invention generally relate to file system events, sessions, and to proxying events and/or sessions. More particularly, at least some embodiments of the invention relate to systems, hardware, software, computer-readable media, and methods configured to determine context for related file system events and to inject external processing into file system sessions and/or events.

File system and network events, as used herein, may include, but are not limited to file system IO (Input/Output), network IO, file system primitives, file system calls, or the like. For example, accessing a disk, at a fundamental level, may involve primitives such as seek to a location or position, read from a location or position, or write to a location or position. Thus, reference to events may include primitives.

File systems events with regard to a resource (e.g., a file, a network port) may occur in a session. Thus, each resource in use may be associated with a different session. Some events may be interpreted as beginning a session (e.g., open a file) and some events may be interpreted as closing the session (e.g., close the file). All events for a given session can be recorded or stored in a session cache. When events are stored in a session in a session cache, metadata related to the events may be obtained, extracted, included and stored in the session. Data associated with the events (e.g., data to be written or to be read) may also be stored in the session. Thus, the session could allow for events to be replayed, audited, or the like.

Embodiments of the invention intercept or filter these events before the events are completed or committed such that the events can be evaluated in context of other events and such that decisions can be made regarding the events. In effect, external processing is injected into the file system or network events. This allows external processing to be performed and allows decisions to be made regarding the events before committing the events. For example, the external processing may determine that a certain file cannot be read or that certain data cannot be written. Alternatively, the external processing may cause a session to be logged, forwarded to another system or entity, or the like. Intercepted data can be forwarded and intelligence can be applied to the event or to the data. This may allow data being written/read to be logged, authorized, altered, obscured, or the like or combination thereof.

Embodiments of the invention may include a file driver implemented in kernel space. Normally, events such as file system primitives are handled in the kernel space. The file driver may be configured such that file system events can be processed with user-space applications. The user-space application can examine contextual information of the event (and of the session) such as file handle, port, IP address, identity information and event content and take actions including data management and security actions based on the contextual information and content.

These actions may include unidirectionally forwarding events (e.g., IO) that meet or match certain criteria to an external system for logging, while allowing the original event to continue unmodified. This enables full audit, replay, and diagnostic abilities. The actions may further include, by way of example only and not limitation, proxying an event and handling the event on behalf of the intended recipient, modifying an event request in flight and then forwarding modified event to the intended recipient, modifying an event response in flight and then forwarding the modified event response to the requestor, obscuring IO information and access patterns from unauthorized users.

Embodiments of the invention may monitor file system events (e.g., primitives), analyze or process these events to identify relevant contextual information and perform external processing. The external processing can act as a proxy for events. Thus, events received by the external processing are processed and then forwarded, not forwarded, logged, altered, or the like as appropriate or based on any applicable or triggered policy. This allows the external processing, such as a user space application, to perform action such as discern user behavior, detect attacks, provide security enforcement, alter data, obscure data, or the like, prior to allowing the event to complete or be performed.

FIG. 1 discloses aspects of file system events in a local file system. FIG. 1 illustrates that multiple file system events, such as a createfile primitive, are performed in a local filesystem 104 to simply create or open a file 102 (e.g., sample.txt). The graph 100 demonstrates that, conventionally, understanding or comprehending the overall user or process behavior is difficult. Similarly, applying a policy is difficult at least because an individual event or primitive has insufficient contextual information. Systemic, user, process, or environment wide phenomena, which may include user or process behavior, is not discernable from these events when the events are viewed individually. Embodiments of the invention allow these events to be viewed as a session holistically and allow external processing to be performed relative to events individually or to sessions.

Figure 2:
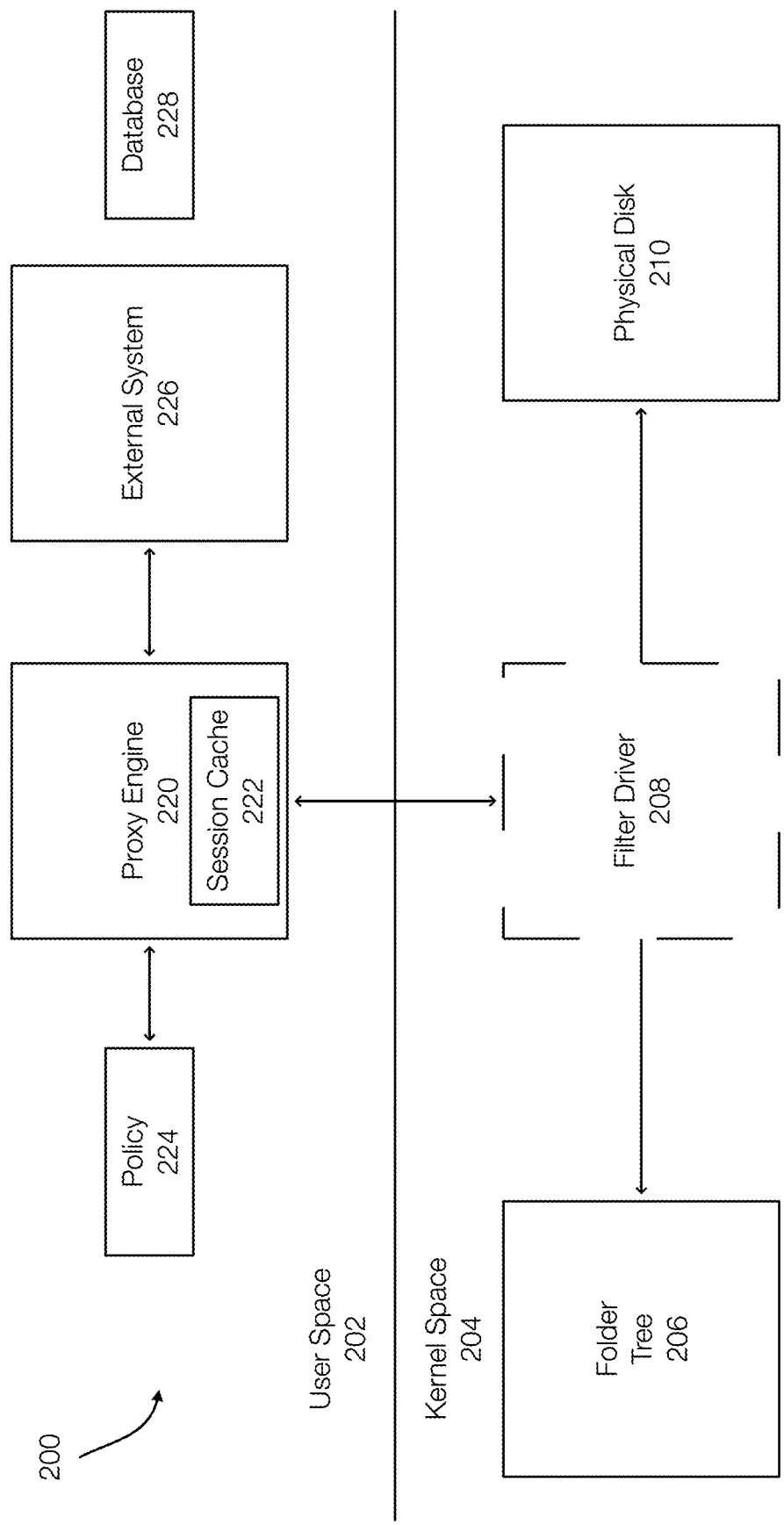
FIG. 2 discloses aspects of a proxy engine configured to inject external processing into IO sessions.

FIG. 2 illustrates an example of a computing system in which sessions are proxied and in which external processing is performed relative to the file system events. The computing system 200 may include processor(s), memory of different types, networking hardware, storage devices, or the like and may be a single machine, multiple machines or the like. The computing system 200 may be implemented in physical machines, virtual machines, container platforms or the like.

In this example, the computing system 200 (or operating system thereof) includes a user space 202 and a kernel space 204. In the kernel space 204, file system events (e.g., primitives) may be performed with respect to a folder tree 206 (or other file system or file system implementation) and a physical disk 210. For example, creating a file in the folder tree 206 results in primitives that are directed to and performed at the physical disk 210. Other events such as opening, reading, writing and other actions performed in the folder tree 206 result in primitives that are performed at the physical disk 210.

Embodiments of the invention relate to a proxy engine 220 that is configured to proxy these events and allow external applications and processes to interact with the events being processed in the kernel space 204. Thus, the proxy engine 220 may be associated with or configured to interact with a filter driver 208. The filter driver 208 may be implemented in the kernel space 204 and may be configured to intercept the file system events, which includes primitives.

The filter driver 208 may intercept events directed to and originating from the folder tree 206 and or the physical disk 210. The intercepted primitives or events are provided to the proxy engine 220. The proxy engine 220 is configured to update a session cache 222 for each invocation of a file system primitive. Updating the session cache 222 by the proxy engine 220 may include extracting contextual information from each primitive such as user, process, resource, or the like. The contextual information is stored in the session cache 222. The session cache 222 may be configured such that the primitives can be associated with specific files or handles or ports or the like. Thus, each file or handle may be associated with a specific session and with specific metadata.

Thus, the proxy engine 220 updates the session cache 222 with the extracted contextual information for each event. The proxy engine 220 may also include information from directory services such as Lightweight Directory Access Protocol LDAP), other external sources, local process information (PID, executable, location), or the like in the session cache. This information or data generated by the proxy engine 220 can be stored in a database 228. The data can also be processed into a logical timeline that can be stored in graph form, as time series data, or the like. The database 228 may be searchable.

More specifically, as IO events or primitives are intercepted and received by the proxy engine 220, the session cache 222 is updated by creating a new entry in the session or updating an existing entry in the session. In one example, data associated with the event (e.g., data or content being read or written) may also be included in the session cache for various reasons including security purposes.

When a session for a file is created in the session cache, information from subsequent events related to that file are included in the same session. Certain events may indicate that a session has concluded. For example, a closefile primitive may cause the corresponding session to be finalized. The session cache 222, for each session, can provide a holistic or time-based view of what happened for each resource or file that is reflected in the session cache 222.

The proxy engine 220 may filter the sessions stored in the session cache 222. The filtering can be performing using different mechanisms, including a list. For example, sessions of interest can be identified by identity (logged in user), the type of action, the metadata associated with the system, the metadata associated with the resource or file and/or location of impact. Stated differently, filtering can be performed based on whether the resource or system is classified, whether the resources or resource location is classified, the sensitivity of the data, or the like. Filtering the sessions allows resources to be more closely monitored before an action is committed. When a session or event of interest is identified, the session may be reconstructed using contextual information for the event and/or the session along with any data contents stored in the session. The proxy engine 220 may interact with a policy 224 (or policies) to identify actions to be performed when the contextual metadata and/or content satisfy conditions that may be set forth in the policy 224. Further, these actions can be performed before the user's request (the intercepted event) is performed or committed. Thus, processing can be injected for any reason as embodied in the triggered policy.

These actions may include, but are not limited to, forwarding or logging the event or the session with an external system 226 while returning the event or primitive back to the kernel space 204 for normal processing. The external system 226 can thus generate an IO or event audit at the external system 226 that can be used for tracing purposes, transaction reproduction, or the like.

The actions may include sending the relevant session or portion thereof to the external system 226 and requesting authorization to continue. If the external system 226 authorizes the event, the primitive or event may be returned to the kernel space 204 for normal processing or servicing. If authorization is denied, the proxy engine 220 may return an access denied or similar response. In this case, the event is not allowed to continue.

Another action may be to perform a manipulate write or a manipulate read (depending on the event). In a manipulate write, the external system 226 may examine the context and the content and make modifications to the data being written. Once modified, the modified data is returned to the kernel space 204 for normal processing, but with the modified data. Similarly, for a modified read, the data read from the disk 210 may be modified prior to sending to the folder tree 206 or to the user.

In another action, the event or session may be obscured. This may hide information from certain users for example by using changes in encryption, obfuscating access patterns, or the like.

FIG. 3A illustrates an example of an architecture for proxying sessions. IO sessions are examples of sessions. FIG. 3A illustrates the proxy engine 220 in more detail. The proxy engine 220 may include a filter driver proxy 302, an implementation of file system primitives 304, a session cache 222, and a context inspection engine 306.

In this example, the filter driver proxy 302 may be executed in the user space 202 and is configured to interface with the filter driver 208, which is operating in the kernel space 204. An example filter driver 208 may include Filesystem in User Space (FUSE). The filter driver proxy 302 ensures that when a kernel-mode API is invoked, the kernel-mode API can be piped to the user space 202.

The implementation of file system primitives, also referred to herein as an implementation engine 304, handles the kernel-mode invocations piped to the user space 202. In one example, the implementation engine 304 may encapsulate and handle the kernel-mode API invocations. The implementation engine 304 may include, by way of example, a class library that allows the event to be processed and stored in the session cache 222. This allows the events piped to the user space 202 to be interpreted or translated to a form that can be processed. This may include identifying relevant metadata or obtaining relevant metadata.

The session cache 222 may include multiple sessions—one for each resource (e.g., file or handle or network port associated with the detected events). The session cache 222 may include, by way of example only, a dictionary or hash map using: (i) a unique session identifier as a key (includes the identity, the file handler, and/or other unique identifiers, (ii) a value associated with a dictionary containing a singleton representing an identity of a user (if any), process metadata including process ID, executable name, file location, application name, and the like, and (iii) a time-ordered list of primitives (e.g., IO events).

The session cache 222 may also include an API, SDK, software shim or other trigger that allows the local events stored in the session cache 222 to be externally readable.

Thus, as events are received via the filter driver proxy 302, the session cache is updated. An event associated with a file or handle not currently present in the session cache results in a new entry in a new session in the session cache 222. The new entry is thus associated with a session. Events associated with existing sessions may result in updating an existing session with a new entry. Sessions (e.g., each file may be associated with a session in the session cache 222) can be created, updated, closed, exported, or the like. A session cache may include multiple sessions for the same file or handle. For example, a session for a file may close and another session may begin before the prior session is exported or processed.

Metadata can be extracted from the sessions and used when injecting processing into the session. If the user specified in the identity is local, user parameters including name and email address may be extracted. If the user specified in the identity is remote (e.g., stored on LDAP), the user information including name, email address, organizational unit, group membership, extended attributes, etc., is retrieved.

The session cache 222, which may include a session interpreter, is configured to interpret a session using a policy 224. More specifically, the policy 224 may provide the session interpreter with a list that dictates to the session interpreter which sessions are of interest. For sessions that are not of interest, the event can be forwarded through the kernel space without further action from the proxy engine 220 other than returning the event back to the filter driver 208.

For sessions of interest, a reconstructed session that include contextual information and/or data may be generated and the reconstructed session may be provided to a context inspection engine 306. The context inspection engine 306 is also informed by the policy 224 and is configured to take or initiate an action when certain contextual and/or content conditions of the policy 224 are satisfied.

For example, the list from the policy 224 may identify resources or files of interest. When an event occurs relative to a file that is not on the list, the event is allowed to proceed normally in the kernel space. If the file is on the list, the context inspection engine 306 may evaluate the session, which may be reconstructed from the session cache, in light of the policy and take an action as warranted. For example, the context inspection engine 306 may compare the metadata and/or data of an event, or of the session with one or more policies, represented by the policy 224.

Figure 3B:
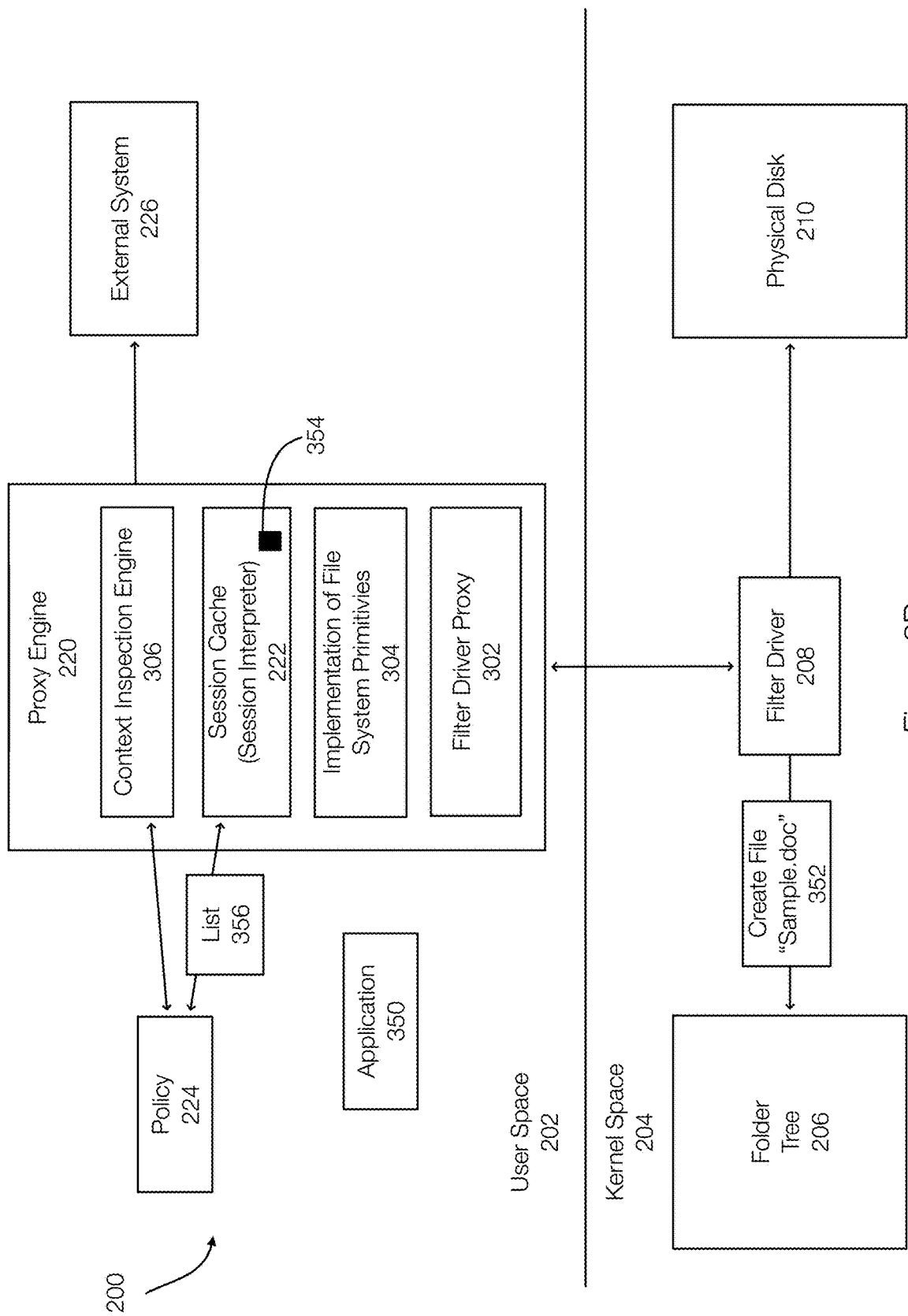
FIG. 3B discloses additional aspects of processing performed by a proxy engine to inject external processing into IO sessions.

FIG. 3B further illustrates an example of file system events (e.g., primitives) that occur in a file system and the relationship of these events to a session in a session cache. FIG. 3B illustrates how a session relative to a specific file or handle (file sample.doc) is captured and stored. FIG. 3B also illustrates aspects of injecting external processing into an IO path or IO processing.

In FIG. 3B, an application 350 may create a file sample.doc 352. This is associated with an IO event, which may be a primitive such as createfile. This primitive may pass through various layers such as an IO manager, but is intercepted by a filter driver 208 in kernel space 204. The intercepted primitive is then delivered, via the filter driver proxy 302 and the implementation engine 304 to the session cache 222 and session interpreter. If a session for the file sample.doc does not exist in the session cache 222, a session is created and a session cache entry 354 is added to the session. If the session exists, the session cache entry 354 is added to the session in the session cache 222 in this example.

The session interpreter associated with the session cache 222 may use a list 356 to determine whether the event is related to a session of interest. If not, an acknowledgment is then returned to the filter driver and the event is marshalled back to the filter driver 208 through the stack. The primitive is then delivered, by the filter driver 208 in the kernel space 204 to the disk 210 through layers such as a file system driver and a physical disk driver.

If the event or associated session is of interest, the context inspection engine 306 may use a reconstructed session, which reconstructed session is generated by combining the entries for the corresponding file or resource stored in the session, and the policy 224 to determine an action. The action may be performed by the external system 226 (the external system 226 may or may not be local to the file system. The external system 226 could be a local application or, for example, a cloud based application. Once the action is completed, the event may be marshalled back to the filter driver 208 or handled in accordance with the policy 224 and the determined action.

When the next event, which may be a command to read the sample.doc file, occurs, a similar flow is performed. However, the corresponding session in the session cache is updated with a new entry because the session for the file sample.doc was previously created. When the command to close the file is intercepted by the filter driver 208 and delivered to the session cache 222, the session for the file in the session cache, which may include multiple entries (e.g., one for each primitive) is closed (and updated as necessary).

Figure 3C:
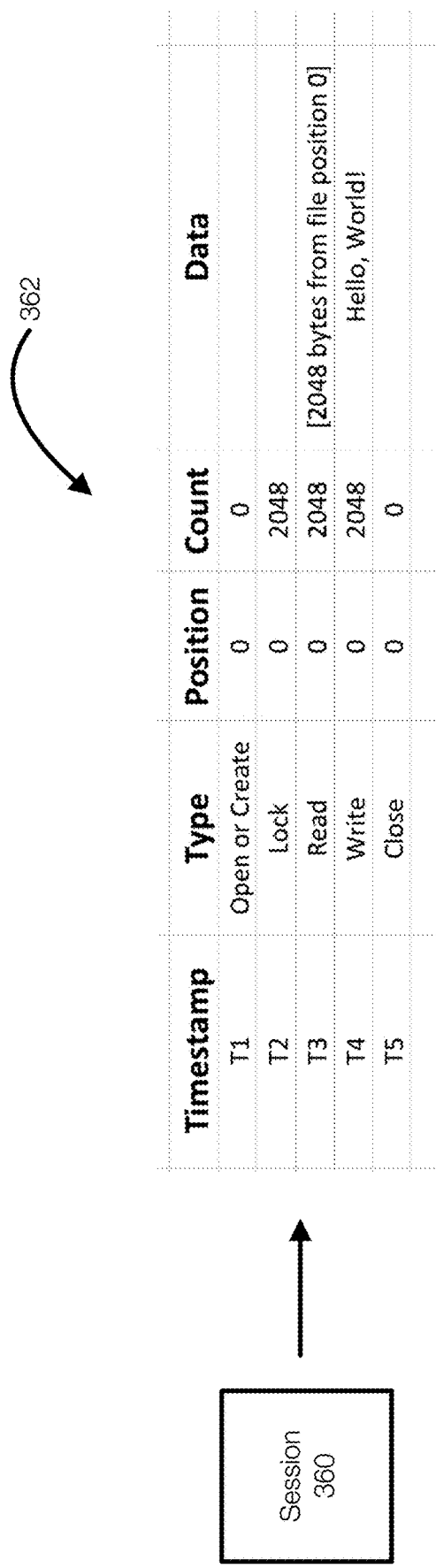
FIG. 3C discloses aspects of a reconstructed session, which is reconstructed from individual event entries included in a session for a resource.

Regardless of whether a session is still open or closed, the session (or multiple sessions) can be processed to generate a reconstructed session. A logical timeline is an example of a reconstructed session. FIG. 3C illustrates an example of a logical timeline. FIG. 3C illustrates an example of a reconstructed session that may be generated from a session in a session cache. FIG. 3C thus illustrates a logical timeline 362 that includes information from each of the entries in the corresponding session 360. In this example, the session 362 is processed such that the logical timeline conveys a sense of the behavior of the user or process. In this example, it is clear that a specific application created a file and wrote "Hello, World!" to that file as text. The file was then closed. As discussed with respect to FIG. 1, the identification of multiple primitives that were issued to simply create a file does not provide a holistic view of what happened to the file. A reconstructed session may include metadata, content (e.g., data read/written during the session) and allows more sophisticated polices to be applied to not only an event but to a session or to the resource itself. The policy can be applied to and manage or control the use of a resource over time. For example, a policy for a given resource may not be invoked until the nth entry adds information or context that triggers the policy.

Processing the information in the session 360 allows the file system events to be presented in a more understandable way and from the perspective of a session, which may cover multiple events. In this case, the file was opened or created, the space on the disk was locked and read. Then, text was written to the reserved space and the filed was closed. The logical timeline or reconstructed session 362 may also include other information such as user information, attributes, or the like as previously described. The logical timeline 362 can be packaged and stored in persistent storage.

Advantageously, a unified view of the lifecycle of a file, object, contents of a directory tree, contents of a bucket, or the like can be tracked for the entire lifecycle. This unified view of the entire lifecycle is important for governance, compliance, provenance, chain of custody, authorization, data manipulation, obfuscation, and the like.

When sessions or reconstructed sessions are persisted, the sessions can be queried (relational database, graph database, time series database). These queries may yield insight into how data is used. For example, queries such as who created a file, who read the file, who wrote to the file, who deleted the file, who read any file containing a specific keyword, who wrote a specific pattern to any file, or the like can be determined.

Embodiments of the invention also allow for novel security mechanisms. Data can be inspected using content inspection techniques prior to allowing a write to be serviced or prior to allowing a read to be returned to a user. Policies can be generated to determine what type of data a user can see, access, use, write, delete, or the like. For example, each time an entry is created in the session cache, the entry including metadata and/or content (as well as other information for the session) can be accessed and policies can be applied to the event based on the event and/or the overall session. Because the event has been detected or intercepted prior to completion, the event can be allowed, altered, prevented, or the like. Further, this allows notifications to be generated. This can protect data from unauthorized users, prevent malware infections, or the like.

The proxy engine may also be configured to generate triggers based on the increased visibility into the file system provided by embodiments of the invention. For example, the proxy engine may be aware that a particular file has a certain classification. When data is written to that file or to a file with that classification, the trigger or policy may be enforced. Other actions may also be performed, such as blocking the event based on the detected event, based on the event and previously detected events in the same session or for the same file/resource.

In operation, the filter driver and user space executable (proxy engine) may be installed on a machine such as a server. The filter driver then sends file system events (IO requests, primitives) to the proxy engine, which maintains a session or session state for each file or resource in use.

When a session is complete, the session cache may serialize the session data and transmit the data to an endpoint that may be configured to process the session data as previously described. The endpoint may load the session data into the relevant storage.

Figure 4:
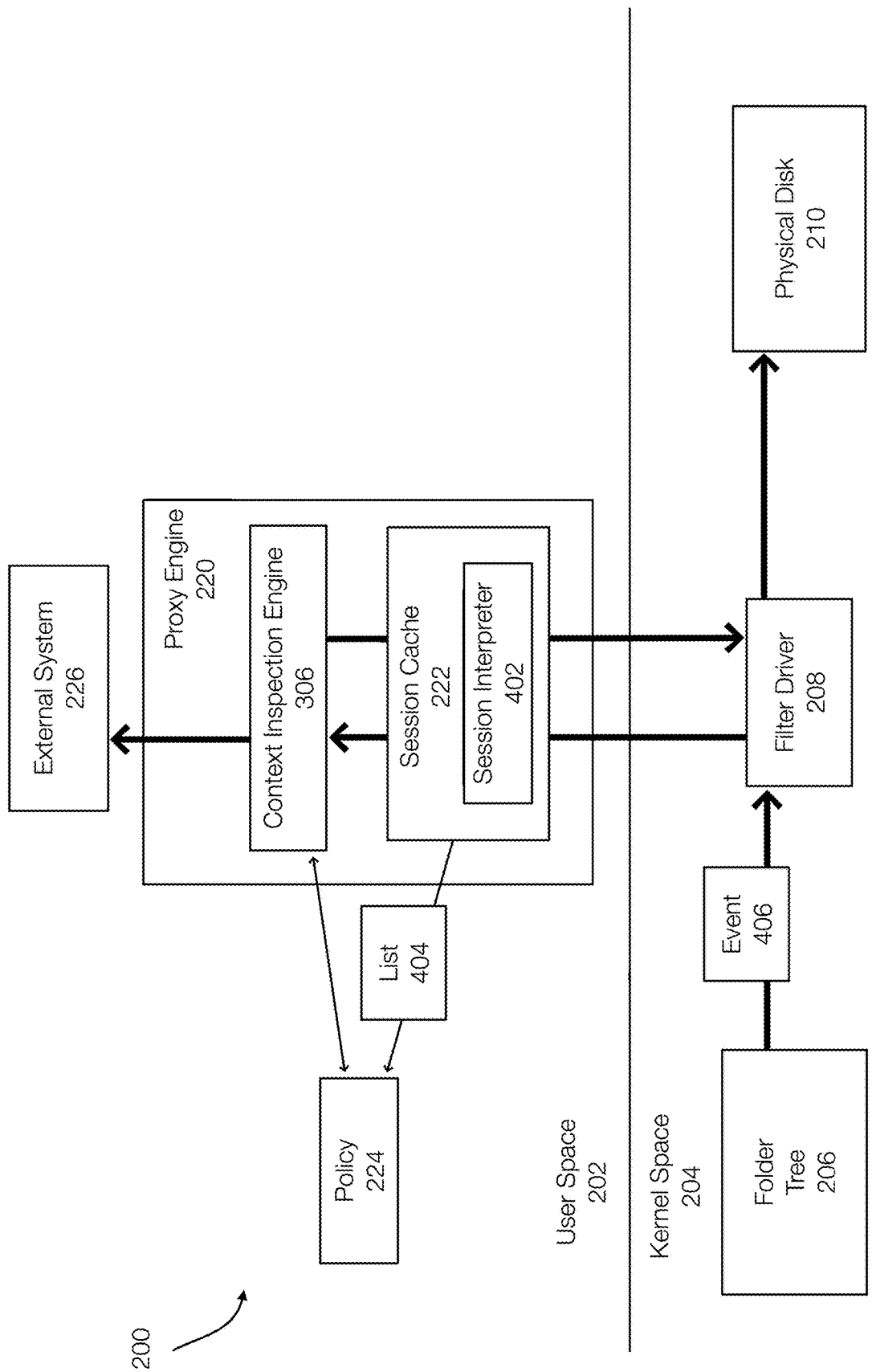
FIG. 4 discloses aspects of a policy-based forwarding action performed with respect to an event.

FIG. 4 illustrates a forward action that is performed on an event. In FIG. 4, an event 406 is intercepted by the filter driver 208 and directed to the proxy engine 220. As the event is processed by the proxy engine 220, the session interpreter 402 may use a list 404 from the policy 224 (or from another source) to determine whether the event corresponds to a session of interest. If the corresponding session is of interest, a reconstructed session, which may include metadata and/or data pertaining to the session, is provided to the context inspection engine 306.

The context inspection engine 306 determines, using the policy 224 and the reconstructed session, that the event and/or session should be forwarded to the external system 226. Forwarding the event and/or session allows the event/session to be logged or stored in a log (e.g., in a datacenter) by the external system 226, for example. The event 406 is returned to the filter driver 208 and is processed normally in the kernel space 204, which may include writing data to the disk 210. Once the forwarding action is determined, the event or reconstructed session is forwarded and, in parallel, the event is also returned for normal processing in the kernel space 204.

More specifically, an IO event such as a disk IO, a network IO, or other IO can be forwarded to an external entity based on the presence of contextual and/or content parameters defined by a policy 224. In one example, an acknowledgement may be required from the external system 226 to ensure transaction consistency, replay ability, diagnostics, and to enable twin use cases.

For example, a policy may be defined to log any IO (or session) where the data contains a regular expression that indicates a credit card number is contained withing the payload and is a certain distance from the term "visa". The policy action may stipulate that the session metadata and data be forwarded to an external entity (RPC, message queue, RESTful) which owns the responsibility of recording the log entry. Thus, once the IO reaches the content inspection engine 306, the event is generated and forwarded to the external system 226. In parallel, the event is returned for normal processing in the kernel.

Figure 5:
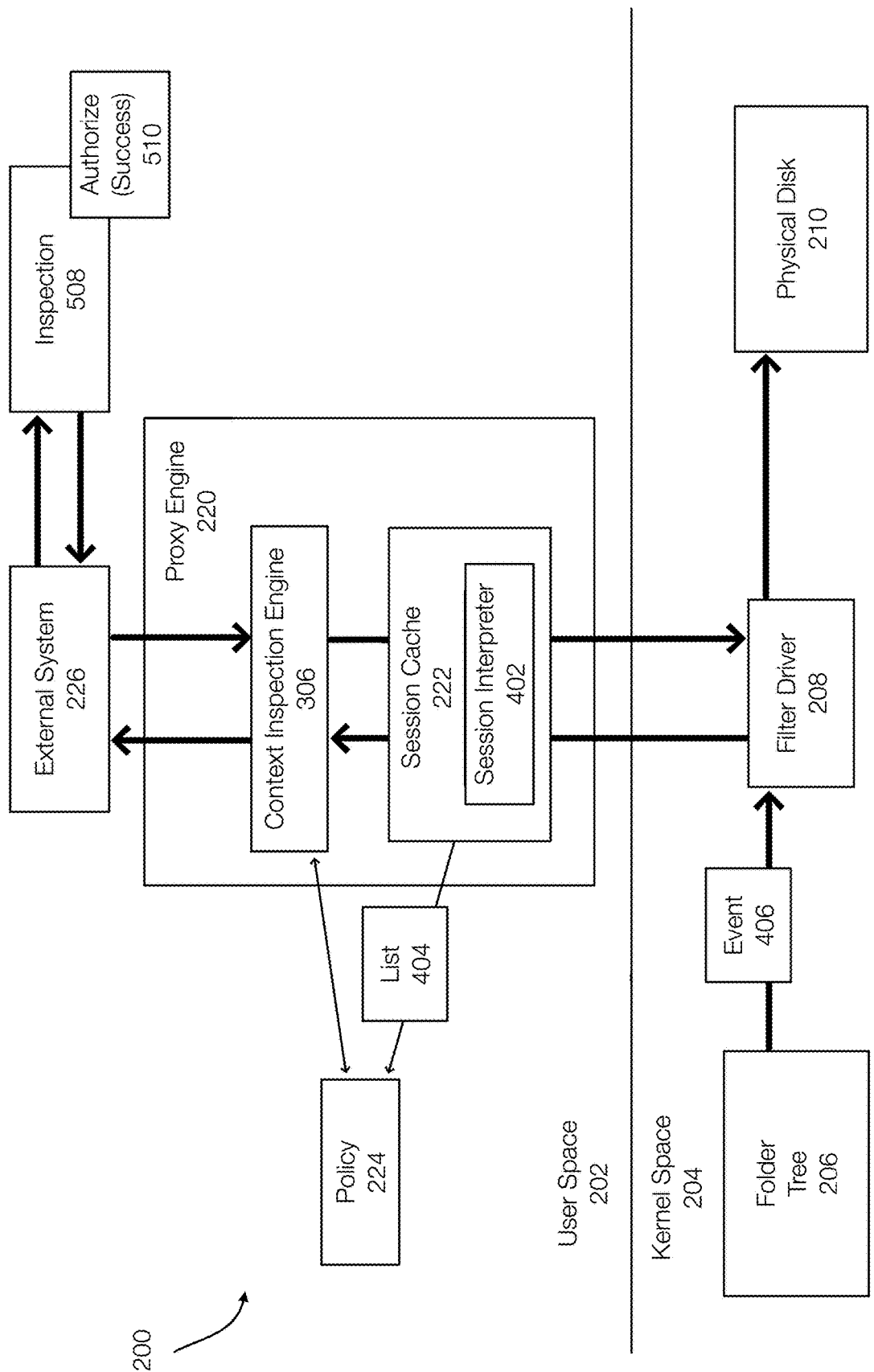
FIG. 5 discloses aspects of a policy-based authorization success action performed with respect to an event.

FIG. 5 depicts aspects of event authorization. In FIG. 5, the event is processed in a similar manner. In this example, the content inspection engine 306 determines that an authorization action is required based on the policy, the event and/or the session. The event and/or the reconstructed session is then provided to the external system 226 and an inspection is performed. In this example, the external system 226 may be to authorize the event. For example, authorization may be required to read or write the data. Alternatively, the identity of the user must have a certain clearance or be part of a particular group.

As illustrated in FIG. 5, embodiments of the invention allow an external authorizer to be integrated into the IO path (which is traditionally in the kernel space). This is an example of injecting external processing into the IO path. Inspecting the event or session with inspection 508 allows authorization to be performed on a broader scope of information including contextual parameters such as identity, external identity attributes such as those stored in active directory or LDAP, broader session related metadata (total time, amount of data transferred, file handles, ports in use, etc.), the content being transmitted (sensitive data may be identified), data access patterns, or the like or combination thereof.

If authorization is successful 510, the external system 226 may return an acknowledgement to the proxy engine 220. The flow continues to the filter driver 208 where the event is allowed to proceed in the kernel space 204. The external system 226 may be, for example an external authorizer such as RPC, message queue, RESTful, or the like.

Figure 6:
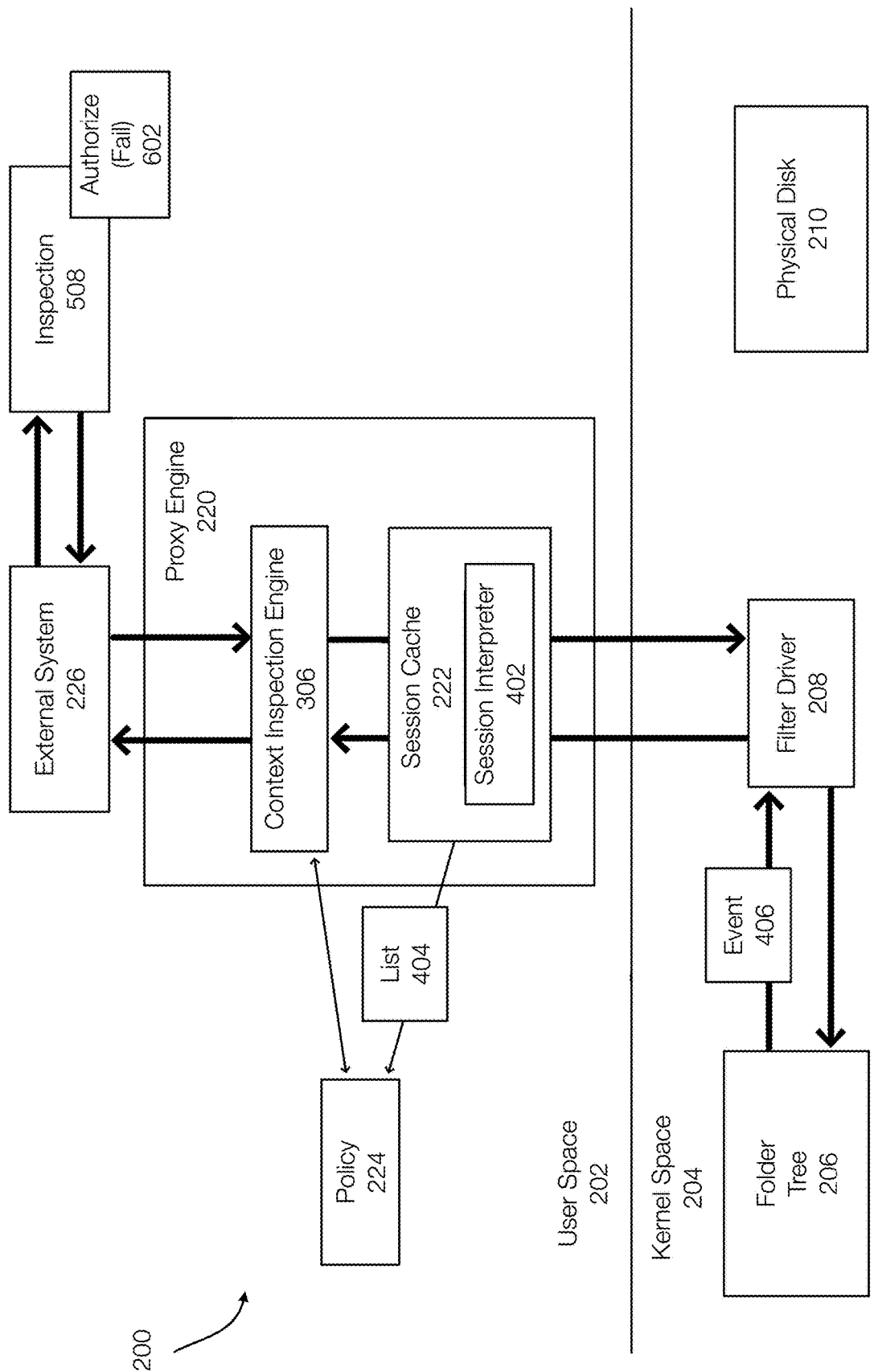
FIG. 6 discloses aspects of a policy-based authorization failure action performed with respect to an event.

FIG. 6 depicts aspects of event authorization. This example is similar to FIG. 5 except that the authorization fails 602. If authorization fails or is denied, the denial is returned to the filter driver 208 and the event is blocked or not permitted. An access message or other indication of failure may or may not be returned to the requestor. Further, any data associated with the event may be discarded or dropped or unacknowledged. Alternatively, the connection may be reset.

Figure 7:
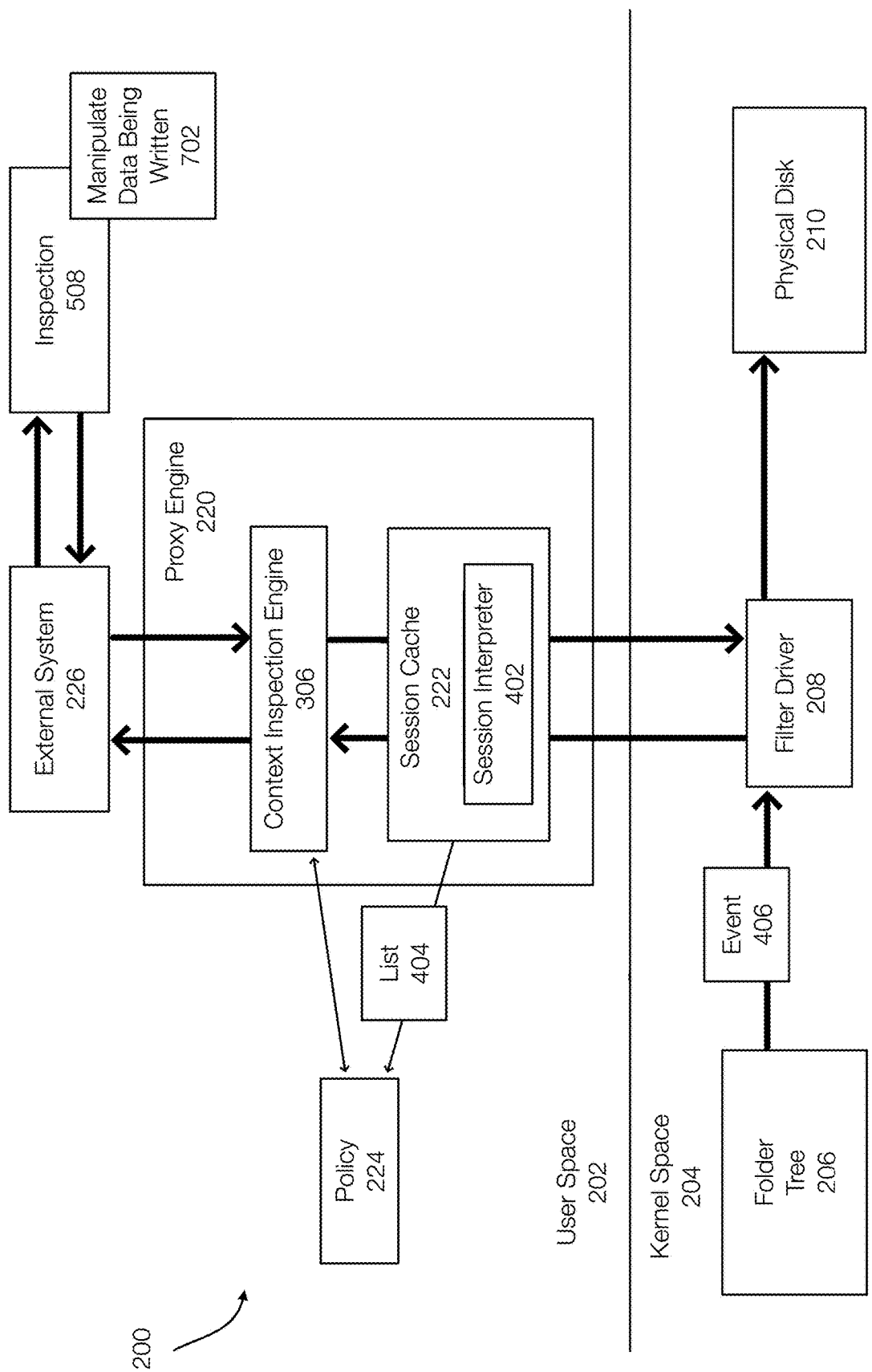
FIG. 7 discloses aspects of a policy-based manipulation for data being written that is performed with respect to an event.

FIG. 7 depicts aspects of event manipulation. More specifically, FIG. 7 illustrates an example where the data being written is manipulated prior to being committed to the disk 210. As previously discussed, the context inspection engine 306 receives the reconstructed session based on session data in the session cache 222 and then applies or evaluates the policy 224.

In one example, the policy 224 may specify that any IO that contains a regular expression representing a credit card number within a certain distance from the term visa should be forwarded to the external system 226. The policy 224 may also require that parts of the credit card number be redacted. The external system 226 (which may include the inspection 508) may manipulate the data being written 702, for example by replacing all numbers of the credit card except the last four digits with a different value (e.g., an "x"). Once the data is inspected 508 in this manner, the redacted or manipulated data is returned to the filter driver 208 for normal processing in the kernel space 204.

Figure 8:
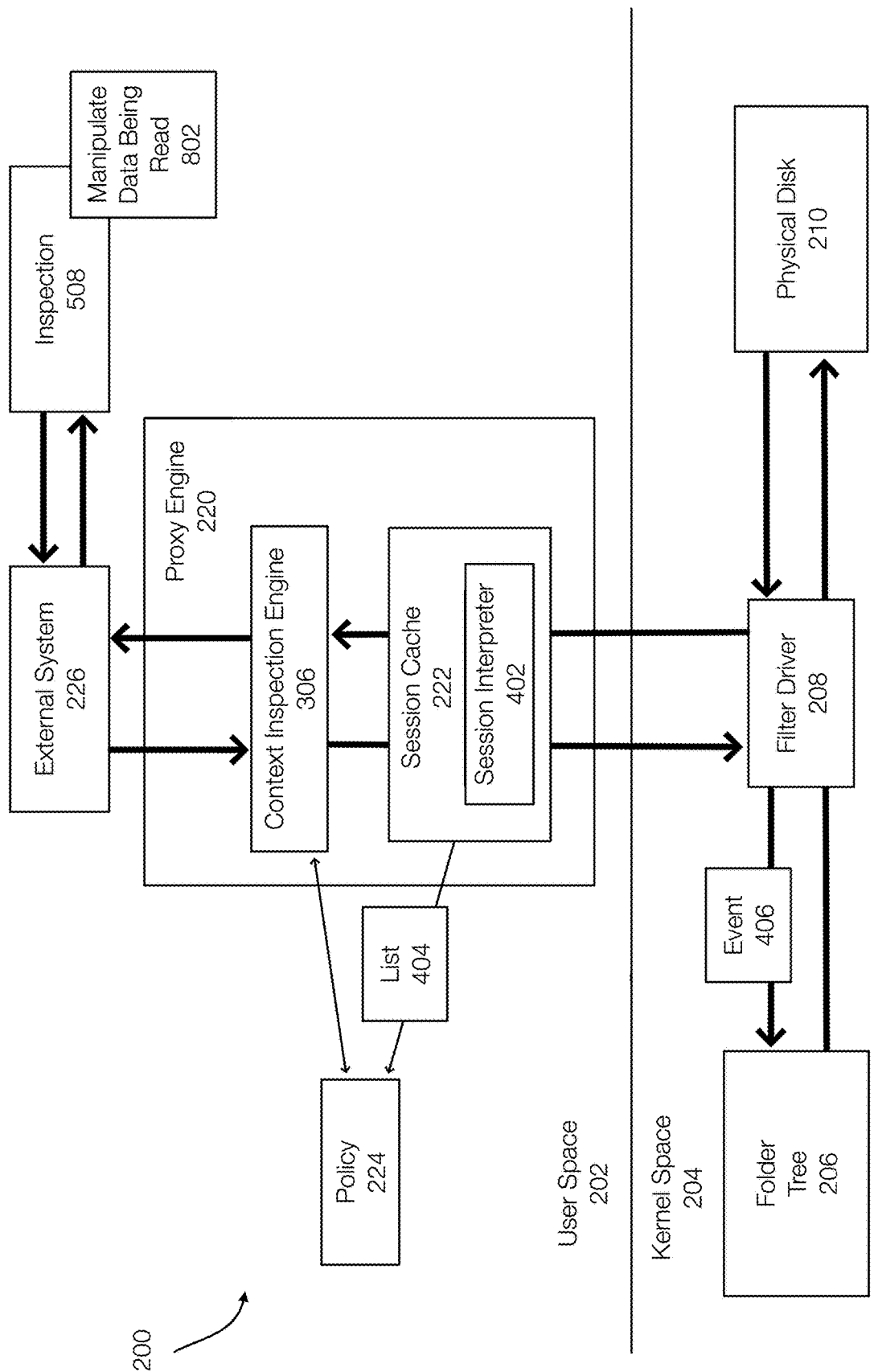
FIG. 8 discloses aspects of a policy-based manipulation for data being read that is performed with respect to an event.

FIG. 8 depicts aspects of event manipulation. More specifically, FIG. 8 illustrates an example where data being read is manipulated prior to being returned. In this example, a read event may be processed normally and data is retrieved from the disk 210. The filter driver 208 intercepts the return (the data read from the disk 210) and passes the event to the proxy engine 220. The context inspection engine 306 may determine that the data being read should be manipulated 802. Thus, the event or IO is provided to an external system 226 that implements the requirements of the policy 224. The inspection 508, in this example, includes manipulating the data being read 802. The manipulated event is returned to the filter driver 208 for normal processing in the kernel space 204 and the manipulated data is returned to the user.

In another example, the policy may include reversible obfuscation for certain users. In this example, the policy 224 may specify that any IO must be manipulated by the external system 226 when the data meets certain criteria. Returning to the visa and credit card example and assuming that access is authorized, the data may be obscured and a key may be required to access the data. Thus, the inspection 508 may include encryption or other data manipulation.

The key could be provided to the requestor in different ways such as in a separate transmission, securely embedded in a region within the data itself, or the like. Only authorized users would be able to actually access the data. In the case of data access patterns, a simulated oblivious RAM could be used obfuscate the data until the user's authorization is confirmed and access to the content is confirmed. Thus, sensitive IO information is available to authorized users or processes, but not to unauthorized users or processes.

In another example, the policy may be to log all IO. This allows all session metadata and content to be stored in a persistent, queryable store (e.g., a relational database, graph database, object store, timeseries database). This facilitates auditing, replaying events in a computing system, tracking errors, root cause analysis, or the like.

Figure 9:
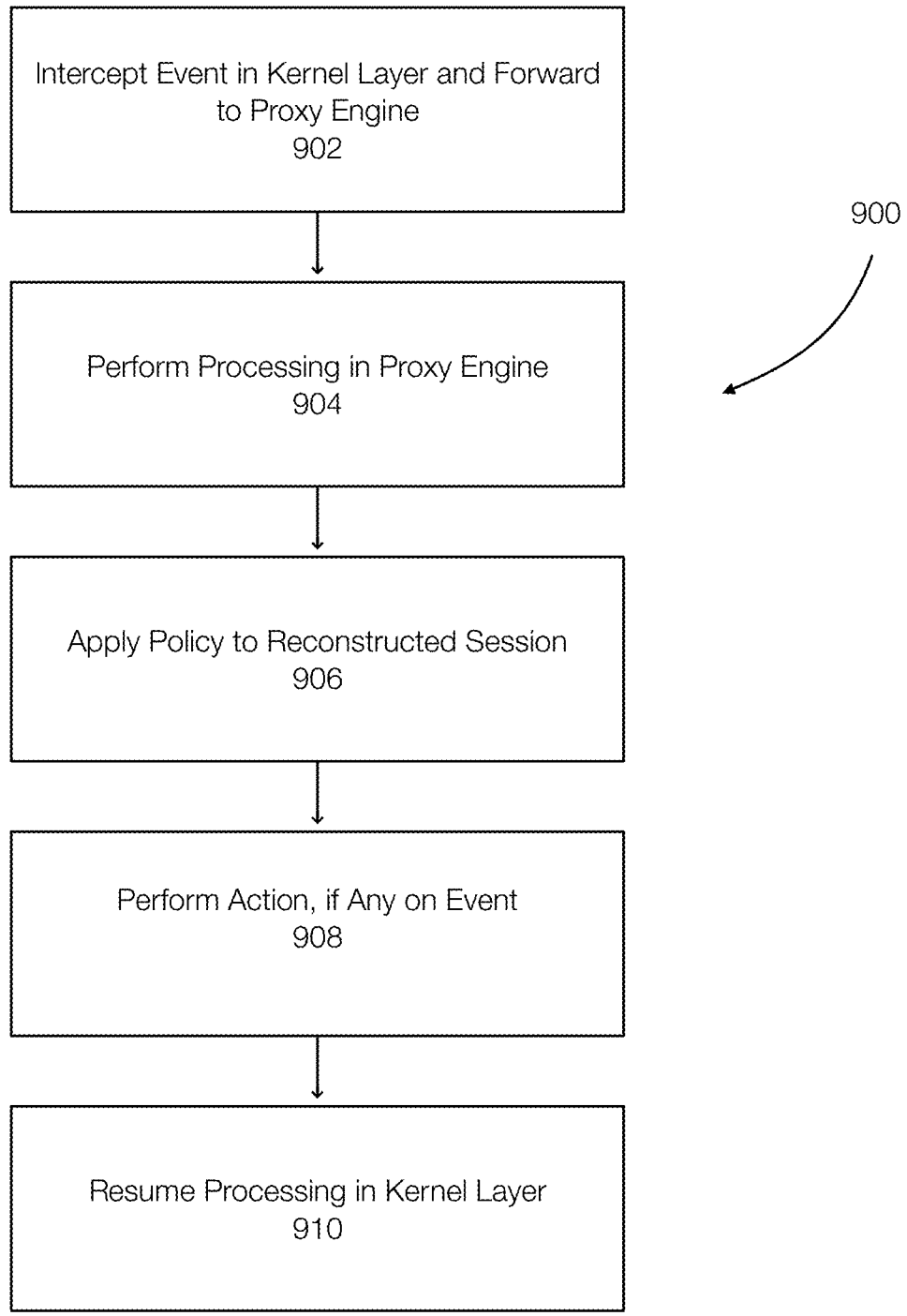
FIG. 9 discloses aspects of a method for injecting external processing into a session.

FIG. 9 discloses aspects of a method for injecting external processing into IO sessions. One a proxy engine and filter driver are operating the method 900, an event may be intercepted 902 by a filter driver in the kernel layer. Intercepting the event may include forwarding the event to a proxy engine, which may be operating in a user space. Typically, the event is not further processed in the kernel layer until the proxy engine has completed its operations.

Thus, the proxy engine processes 904 the event. Processing the event may include receiving the event with a proxy filter driver, interpreting the event, creating or updating a session for the resource (e.g., file, network port) associated with the event, and determining whether the event or the associated session is of interest. Sessions of interest may be determined using a list or based on an analysis of the session metadata and/or data. For example, determining that the data includes a credit card number indicates that the session is a session of interest.

Once a session of interest is determined, one or more policies are applied 906 to the session, which may be reconstructed from the entries of the session in the session cache. The reconstructed session can be evaluated and compared to policies to determine which policies apply. If a policy applies, the policy may specify an action. In some examples, the session can be used to determine whether a policy is applied without being reconstructed. Accessing the metadata and/or content in the session may be sufficient to evaluate the policies.

The action determined from any applicable policy, if any, is performed 908. This may include forwarding the event and/or the session (including data and/or metadata) to an external system. The external system may perform actions such as logging, authorizing, manipulating, obscuring, or the like or combination thereof. Once the action is performed, the processing resumes 910 in the kernel layer.

By intercepting events, external processing can be injected into the IO handling. Advantageously, the external processing can be performed on the basis of broader knowledge rather than simply on the event itself. The ability to access metadata and/or data of a session allows for broader and more intelligent actions to be performed on data.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, engines, modules, and components, that individually and/or collectively implement, and/or cause the implementation of, operations which may include, but are not limited to, correlation operations and related operations. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client or engine may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, containers, or any combination of these, though no particular device implementation or configuration is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

Any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising intercepting an event at a filter driver in a kernel space, wherein the event is associated with a resource of a computing system, wherein the event is associated with a session and wherein the session includes an entry for each event associated with the resource, applying a policy to the event to determine an action to be performed on the event using metadata and/or data stored in the session, performing the action on the event in accordance with the policy, and returning the event to the filter driver to resume processing in the kernel space.

Embodiment 2. The method of embodiment 1, further comprising determining whether the session is of interest based on a list, wherein the event is returned to the filter driver when the session is not of interest for normal processing in the kernel space.

Embodiment 3. The method of embodiment 1 and/or 2, wherein the metadata includes a session identifier, a handle, an identity of a user, process metadata including process ID, executable name, resource location, and application name, and timestamps and the data includes data to be written or data read from a data store.

Embodiment 4. The method of embodiment 1, 2, and/or 3, wherein the action is logging, further comprising logging the event by an external system.

Embodiment 5. The method of embodiment 1, 2, 3, and/or 4, wherein the action is authorization, further comprising authorizing or denying the event.

Embodiment 6. The method of embodiment 1, 2, 3, 4, and/or 5, wherein the action is manipulation, further comprising: manipulating data associated with the event that is to be written to a data store, or manipulating data that has been read from the data store and returning the manipulated data to a requestor.

Embodiment 7. The method of embodiment 1, 2, 3, 4, 5, and/or 6, wherein the action is obscuring, further comprising obscuring data associated with the event.

Embodiment 8. The method of embodiment 1, 2, 3, 4, 5, 6, and/or 7, further comprising generating a reconstructed session from entries in the session, which is stored in a session cache, and applying the policy to the reconstructed session.

Embodiment 9. The method of embodiment 1, 2, 3, 4, 5, 6, 7, and/or 8, further comprising forwarding the event to a proxy engine operating in a user space.

Embodiment 10. The method of embodiment 1, 2, 3, 4, 5, 6, 7, 8, and/or 9, further comprising interpreting the event.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1 through 11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' or 'engine' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' or 'computing system' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 10:
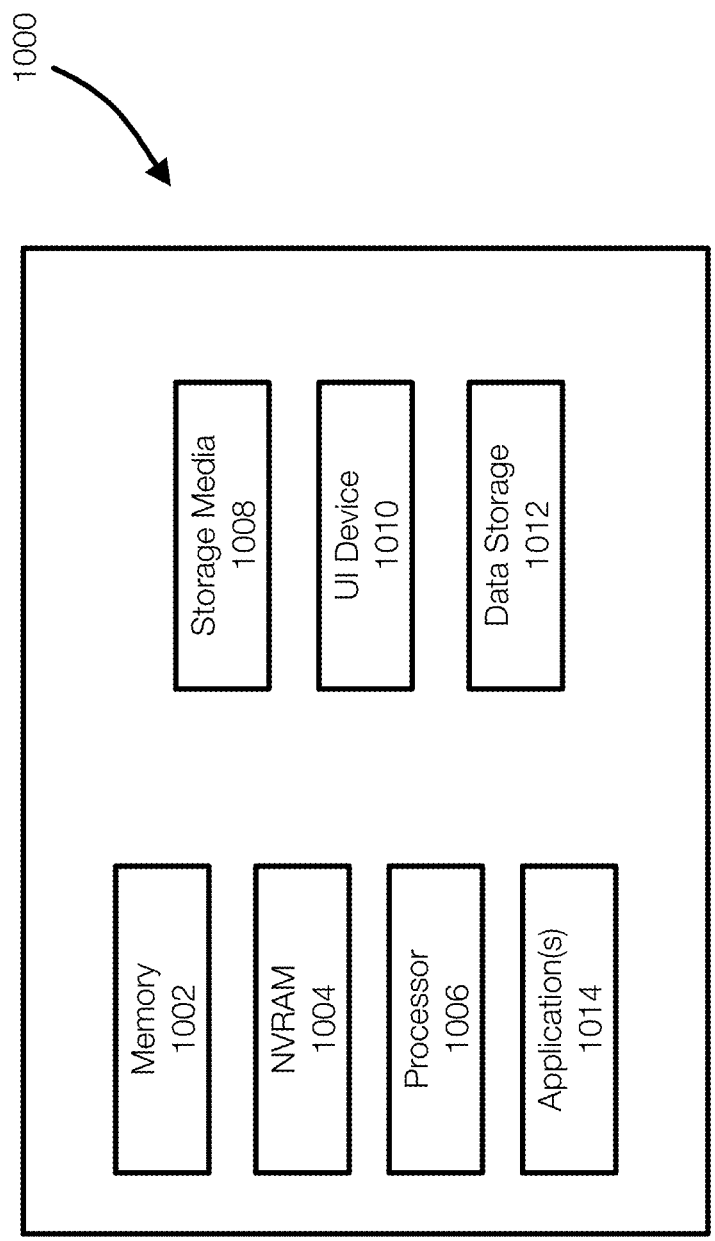
FIG. 10 discloses aspects of a computing system.

With reference briefly now to FIG. 10, any one or more of the entities disclosed, or implied, by the Figures and/or elsewhere herein, may take the form of, or include, or be implemented on, or hosted by, a physical computing device, one example of which is denoted at 1000. As well, where any of the aforementioned elements comprise or consist of a virtual machine (VM), that VM may constitute a virtualization of any combination of the physical components disclosed in FIG. 10.

In the example of FIG. 10, the physical computing device 1000 includes a memory 1002 which may include one, some, or all, of random access memory (RAM), non-volatile memory (NVM) 1004 such as NVRAM for example, read-only memory (ROM), and persistent memory, one or more hardware processors 1006, non-transitory storage media 1008, UI device 1010, and data storage 1012. One or more of the memory components 1002 of the physical computing device 1000 may take the form of solid state device (SSD) storage. As well, one or more applications 1014 may be provided that comprise instructions executable by one or more hardware processors 1006 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   intercepting an event at a filter driver in a kernel space, wherein the event is associated with a resource of a computing system, wherein the event is associated with a session and wherein the session includes an entry for each event associated with the resource that occurred in the session;
   directing the event to a proxy engine operating in a user space;
   determining the session associated with the event is a session of interest by the proxy engine;
   generating a reconstructed session from entries in the session, which is stored in a session cache, wherein the reconstructed session includes the event;
   applying a policy to the reconstructed session to determine an action to be performed on the event using metadata and/or data stored in the session, wherein the metadata is related to the event;
   forwarding the reconstructed session to an external system, wherein the action is performed by the external system and wherein the action includes injecting an external processing into an IO (input/output) associated with the event based on the reconstructed session before the event is committed in the computing system, wherein the action is obscuring data, by the external system, associated with the event, wherein the data is unobscured when authorized at a later time; and
   returning the event to the filter driver to resume processing in the kernel space.

2. The method of claim 1, wherein the event is returned to the filter driver when the session is not of interest for normal processing in the kernel space.

3. The method of claim 1, wherein the metadata includes a session identifier, a handle, an identity of a user, process metadata including process ID, executable name, resource location, and application name, and timestamps and the data includes data to be written or data read from a data store.

4. The method of claim 1, wherein the action is logging, further comprising logging the event by the external system.

5. The method of claim 1, wherein the action is authorization, further comprising authorizing or denying the event by the external system.

6. The method of claim 1, wherein the action further includes manipulation, the method further comprising:
   manipulating data associated with the event that is to be written to a data store by the external system; or
   manipulating data, by the external system, that has been read from the data store and returning the manipulated data to a requestor.

7. The method of claim 1, further comprising interpreting the event.

8. A non-transitory storage medium having stored therein instructions that are executable by one or more hardware processors to perform operations comprising:
   intercepting an event at a filter driver in a kernel space, wherein the event is associated with a resource of a computing system, wherein the event is associated with a session and wherein the session includes an entry for each event associated with the resource that occurred in the session;
   directing the event to a proxy engine operating in a user space;
   determining the session associated with the event is a session of interest by the proxy engine;
   generating a reconstructed session from entries in the session, which is stored in a session cache, wherein the reconstructed session includes the event;
   applying a policy to the reconstructed session to determine an action to be performed on the event using metadata and/or data stored in the session, wherein the metadata is related to the event;
   forwarding the reconstructed session to an external system, wherein the action is performed by the external system and wherein the action includes injecting an external processing into an IO (input/output) associated with the event based on the reconstructed session before the event is committed in the computing system, wherein the action is obscuring data, by the external system, associated with the event, wherein the data is unobscured when authorized at a later time; and
   returning the event to the filter driver to resume processing in the kernel space.

9. The non-transitory storage medium of claim 8, wherein the event is returned to the filter driver when the session is not of interest for normal processing in the kernel space.

10. The non-transitory storage medium of claim 8, wherein the metadata includes a session identifier, a handle, an identity of a user, process metadata including process ID, executable name, resource location, and application name, and timestamps and the data includes data to be written or data read from a data store.

11. The non-transitory storage medium of claim 8, wherein the action is logging, further comprising logging the event by the external system.

12. The non-transitory storage medium of claim 8, wherein the action is authorization, further comprising authorizing or denying the event by the external system.

13. The non-transitory storage medium of claim 8, wherein the action further includes manipulation, the method further comprising:
    manipulating data associated with the event that is to be written to a data store by the external system; or manipulating data, by the external system, that has been read from the data store and returning the manipulated data to a requestor.

14. The non-transitory storage medium of claim 8, further comprising interpreting the event.

15. A method, comprising:
    intercepting an event at a filter driver in a kernel space, wherein the event is associated with a resource of a computing system, wherein the event is associated with a session and wherein the session includes an entry for each event associated with the resource that occurred in the session;
    directing the event to a proxy engine operating in a user space;
    determining the session associated with the event is a session of interest by the proxy engine;
    generating a reconstructed session from entries in the session, which is stored in a session cache, wherein the reconstructed session includes the event;
    applying a policy to the reconstructed session to determine an action to be performed on the event using metadata and/or data stored in the session, wherein the metadata is related to the event;
    forwarding the reconstructed session to an external system, wherein the action is performed by the external system and wherein the action includes injecting an external processing into an IO (input/output) associated with the event based on the reconstructed session before the event is committed in the computing system, wherein the action is authorization or manipulation, by the external system, associated with the event, wherein the data is unobscured when authorized at a later time; and
    returning the event to the filter driver to resume processing in the kernel space.

* * * * *